United States Patent
Wise

[15] 3,692,044
[45] Sept. 19, 1972

[54] TAPPING TEE
[72] Inventor: Eugene H. Wise, Newhall, Calif.
[73] Assignee: R & G Sloane Manufacturing Company, Inc., Los Angeles, Calif.
[22] Filed: Jan. 18, 1971
[21] Appl. No.: 107,183

[52] U.S. Cl. .................................................137/318
[51] Int. Cl. .........................B23b 41/08, F16e 41/04
[58] Field of Search .............................137/317, 318

[56] References Cited

UNITED STATES PATENTS

| | | | |
|---|---|---|---|
| 3,240,226 | 3/1966 | Burkholder | 137/318 |
| 3,176,708 | 4/1965 | Shields | 137/318 |
| 3,094,137 | 6/1963 | Burke | 137/318 |
| 2,794,352 | 6/1957 | Mueller | 137/318 X |
| 3,307,435 | 3/1967 | Floren | 137/318 X |
| 3,460,553 | 8/1969 | Leopold, Jr. et al. | 137/318 X |
| 3,561,298 | 2/1971 | Graffenreid et al. | 137/318 X |

Primary Examiner—M. Cary Nelson
Assistant Examiner—David R. Matthews
Attorney—Tipton D. Jennings

[57] ABSTRACT

A tapping tee comprising a body portion defining a drive socket and one or more outlet sockets in communication with the drive socket, and a saddle portion adapted to mate with and be mounted on the exterior of a main pipeline formed of a plastic material or the like. A stem member is mounted within the drive socket for rotatable and axial movement therein, such as by threaded connection. At its inner end, the stem member comprises a cylindrical cutter having a thin annular wall with a downwardly and inwardly, uniformly tapering exterior surface. When the stem member is rotated within the drive socket, such as by a suitable tool engaged with its outer end, the cutter is rotated and advanced inwardly into engagement with the plastic main pipeline. The cutter severs a circular coupon from the main pipeline and this coupon is retained within the cutter, owing to the slight deformation inwardly of the lower portion of the thin annular wall of the cutter as it is advanced through the pipeline. The tapered outer surface of the cutter creates a complementary annular tapered surface defining the opening in the pipeline. The cutter can thereafter be mated with this annular tapered surface of the pipeline to seal the opening cut therein, with the resultant advantage that the cutter can serve as a valve member for sealing the cut opening in the pipeline after the coupon is removed therefrom. A stop member is provided on the stem member above the cutter for the purpose of limiting the upward movement of the stem member and also preventing the cutter from extending too far into the main pipeline.

10 Claims, 4 Drawing Figures

PATENTED SEP 19 1972　　3,692,044
FIG.2
FIG.1
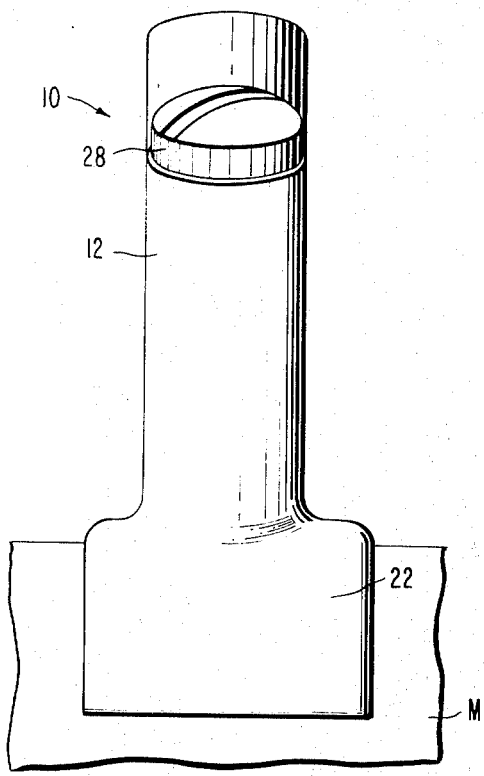
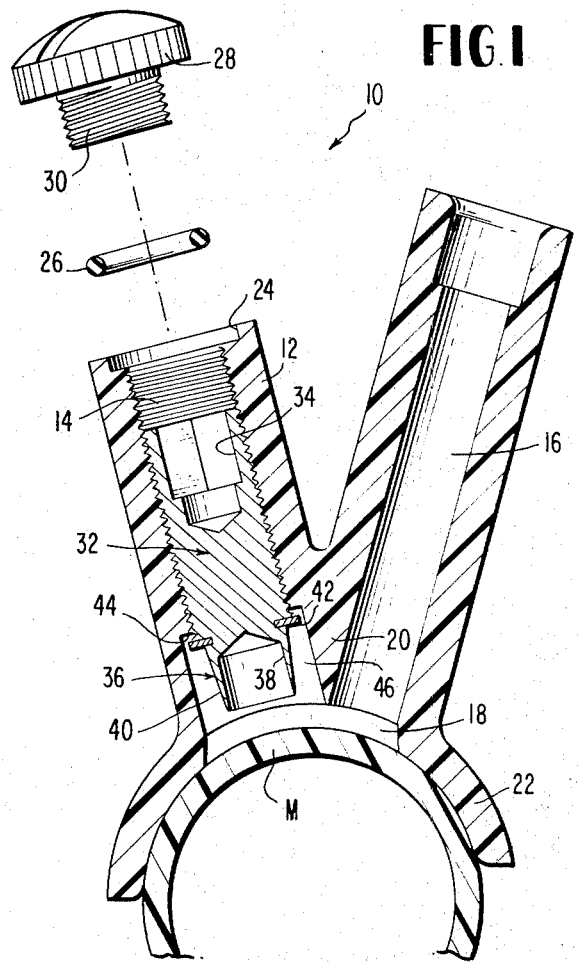
FIG.3
FIG.4
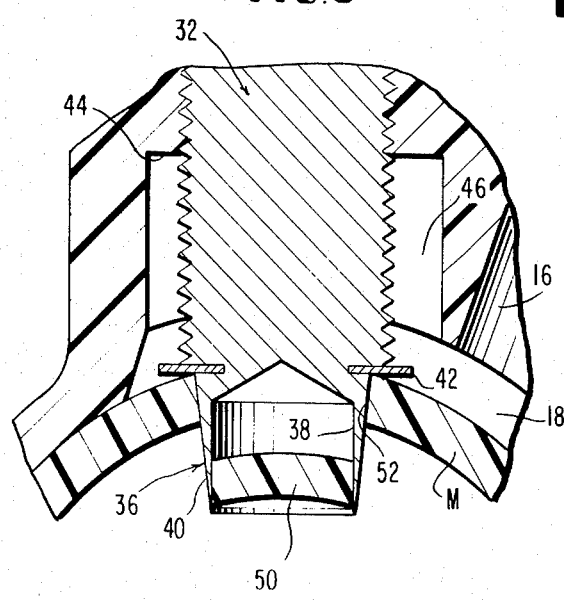
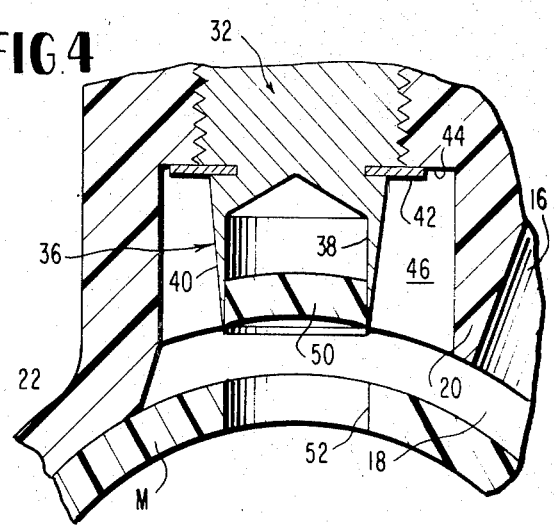
INVENTOR
EUGENE HUBERT WISE
BY　*Martha L. Ross*
　　AGENT

TAPPING TEE

BACKGROUND OF THE INVENTION

This invention relates to a tapping tree and, more particularly, to a tapping tee for a plastic pipeline which may be easily mounted on the pipeline and which can be utilized to cut an opening in the pipeline and thereafter to selectively open or close the opening.

Plastic mains or pipelines for transporting fluids under pressure, and particularly plastic pipelines for gas distribution, and plastic service pipes running from such pipelines into consumers' dwellings, are now being extensively used. The employment of such plastic pipelines involes the problems of connecting service lines thereto when the main pipeline is already in service. It is desirable to effect the connection of a service line to the main pipeline without any escape of fluid to the atmosphere, and this is particularly important when the main pipeline is carrying gas, the escape of which would create a hazardous condition. More recently, the problem has become even more acute, owing principally to the increasing use of higher pressures in gas pipelines formed of plastic materials.

Service and tapping tees for connecting service lines to plastic pipelines, when the latter are in service, have been developed and are presently in extensive use. These tapping tees, however, have not been entirely satisfactory owing to an appreciable leakage of fluid from the main pipeline to the atmosphere during the connecting operation. Although such leakage has been relatively small in the case of gas, any leakage whatsoever obviously creates a potentially hazardous situation.

Further, many of the service and tapping tees previously used have allowed chips or cuttings to fall into the main pipeline during the tapping operation. Such debris has been found highly undesirable in such pipelines, since it may result in the clogging of valves in the main pipeline, or enter service lines and clog customers' valves or burners or the like. Also, many service tees used for attachment to plastic pipelines have had no means for shutoff in the event that repairs to the service lines have been necessary.

SUMMARY OF THE INVENTION

The tapping tee of the present invention is not subject to the disadvantages of the prior art tapping tees mentioned above and, additionally, possesses advantages that can not be obtained through the use of prior art tapping tees.

The tapping tee of this invention comprises a body portion having a drive socket and one or more outlet sockets in communication with the drive socket, and a saddle portion adapted to mate with and be mounted on the exterior surface of a main pipeline formed of a plastic material. A stem member is mounted within a drive socket through a threaded connection and thus is both rotatable and axially movable within the drive socket. At its outer end, the stem member is provided with a socket for accommodating the end of a suitable tool, such as a wrench, for effecting rotation of the stem member within a drive socket. At its inner end, the stem member is provided with a generally cylindrical cutter having a thin annular wall with a cylindrical inner surface and an outer surface that is tapered downwardly and inwardly in a uniform manner throughout the entire length of the cutter.

When the stem member is rotated so as to move downwardly in the drive socket, the cutter engages the main pipeline and cuts a circular coupon therefrom. Since the lower portion of the thin cutter wall is permanently deformed inwardly a small amount owing to its engagement with the cut wall of the main pipeline, the coupon is retained within the cutter and is effectively prevented from dropping into the main pipeline. The outer tapered surface of the cutter forms a complementary tapered surface surrounding the cut opening in the main pipeline. This tapered surface on the pipeline serves as a valve seat against which the outer surface of the cutter may be engaged to close and seal the cut opening in the pipeline. It will be readily seen, therefore, that, after the coupon has been removed from the main pipeline, the cut hole therein may be selectively opened or closed by merely moving the tapered cutter into and out of engagement with the complementary tapered surface defining the opening in the pipeline.

A stop member is provided on the stem member above the cutter and serves to engage an inner surface of the body portion of the tee when the stem member is moved outwardly in the drive socket, thereby limiting the outward movement of the stem member. The stop member is also adapted to engage the adjacent outer surface of the main pipeline after the coupon has been cut therefrom to limit the extent of movement of the cutter into the main pipeline and to prevent the cutter from cutting through the opposite wall of the main pipeline.

As an additional feature, the threads on the outer surface of the stem member may be of a pitch that differs slightly from the pitch of the threads on the inner surface of the body portion defining the drive socket. This difference in pitch serves to provide a slight interference fit between the stem member and the body portion so as to effectively prevent leakage of fluid between the stem member and the body portion.

BRIEF DESCRIPTION OF THE DRAWING

FIG. 1 is a front elevational view in section of a tapping tee formed in accordance with the principles of the present invention;

FIG. 2 is a side elevational view of the tapping tee shown in FIG. 1;

FIG. 3 is an enlarged elevational view of a portion of the tee shown in FIG. 1, showing the cutter when it has cut completely through the main pipeline; and FIG. 4 is a view similar to FIG. 3, showing the cutter after it has been withdrawn from the hole cut in the main pipeline.

DESCRIPTION OF THE PREFERRED EMBODIMENT

The tapping tee 10 of the present invention is of unitary construction and comprises a body portion 12 defining a threaded drive socket 14 and an outlet socket 16 in communication with the drive socket 14. The outlet socket 16 is in communication with the drive socket 14 through a channel 18 disposed adjacent the lower end of an intermediate wall 20 of the body portion 12.

The tee 10 also comprises a saddle portion 22 that is formed integrally with the body portion 12 and is adapted to mate with and be secured to the outer surface of a main pipeline M formed of a plastic material which is to be tapped. The saddle portion 22 may be secured to the main pipeline M in any suitable manner, such as by solvent welding, fusion bonding, or by a pair of band clamps with a gasket disposed between the saddle portion and the adjacent outer surface of the pipeline M.

The tapping tee 10 preferably is molded from a suitable plastic material such as polyvinyl chloride (PVC), polypropylene, polyethylene or acrylonitrile butadiene styrene (ABS). The body portion 12 of the tee 10 could have any suitable configuration within the scope of this invention. For example, more than one outlet socket may be provided in the body portion 12, and each outlet socket could be at any suitable or desired angle to the drive socket. Preferably, the outer end of the body portion defining each outlet socket is constructed such that it may be connected in any suitable manner to an outlet pipe (not shown), such as by a threaded connection, solvent welding or fusion bonding.

As shown in FIG. 1, the outer end of the body portion 12 defining the drive socket 14 is provided with a recessed portion 24 in which a sealing member such as an O-ring 26 is adapted to be seated for the purpose of providing a seal for a cap member 28 having a threaded stem 30 that is adapted to be threaded into the outer end of the drive socket 14 for the purpose of closing it.

A stem or plug member 32 is disposed within the drive socket 14 and is provided with exterior threads that are in engagement with the threads on the interior of the body portion 12 defining the drive socket. At its outer end, the stem member 32 is provided with a socket 34 that is adapted to receive the mating end of a turning tool (not shown), such as a wrench, that is inserted into the drive socket 14 for the purpose of rotating and axially advancing the stem member 32 in the drive socket. In practice, when it is desired to move the stem member 32 within the drive socket 14, the cap 28 is removed from the body portion 12 and the tool is inserted into the drive socket 14. When the stem member 32 has been rotated and axially advanced within the drive socket 14 to a desired extent, the turning tool is removed from the drive socket and a cap 28 is thereafter threaded onto the body portion 12 to close and seal the drive socket 14.

At its inner end, the stem member 32 is provided with a cutter 36 that is preferably formed integrally therewith. It is noted, however, that the cutter 36 may be formed separately from the stem member 32 and connected thereto in any suitable manner. The cutter 36 is generally cylindrical in shape and is provided with a thin annular wall that is defined by a cylindrical inner surface 38 and a downwardly and inwardly tapering, frustoconical outer surface 40 extending throughout the entire length of the cutter. The cutter 36, therefore, is tapered to a very thin sharp cutting edge which is adapted to make a sharp even cut in the main pipeline M to avoid the formation of chips or other cuttings during the cutting operation.

The stem member 32 and cutter 36 preferably are formed of a suitable metal, such as a suitable steel or hard aluminum and the lower portion of the cutter 36 is sufficiently thin and flexible so as to acquire a small permanent inward set as the cutter is advanced through the main pipeline M in a manner to be described hereinafter. As an illustrative example, for a cutter of approximately one-half inch in diameter, the cutting edge may be 0.002 to 0.003 inches in thickness.

A stop member of any suitable construction, such as an annular stop ring 42, is mounted on the stem member 32 adjacent the upper portion of the cutter 36 for the purpose of limiting the inward and outward movement of the stem member 32 and cutter within the drive socket 14. The stop ring 42 is adapted to limit the outward movement of the stem 32 by engaging an upper annular surface 44 of an enlarged socket portion 46 in which the cutter 36 and stop ring 42 are disposed when the stem member 32 is in an upper position within the drive socket 14. The stop ring 42 serves to limit the downward movement of the cutter and its penetration into the main pipeline M by engaging the outer surface of the main pipeline M when the cutter cuts through the pipeline, thereby preventing the cutter 36 from cutting through more than one wall of the pipeline, as shown in FIG. 3.

As an additional feature, the exterior threads on the stem portion 32 are formed of a pitch that differs slightly from the pitch of the interior threads on the body portion 12 defining the drive socket 14. In this manner, there is a slight interference fit between the stem member 32 and the interior surface of the body portion 12 defining the drive socket 14. This interference fit serves to provide a fluidtight seal between the stem member 32 and the body portion 12, thereby preventing the leakage of any fluid therebetween. As an illustrative example, the stem member 32 may have an 18-pitch thread while the body portion 12 defining the drive socket may have a 17-pitch thread. Since the stem member 32 is formed of metal and the body portion 12 of the tee 10 is formed of a plastic material, the threads on the stem member 32 serve to reform the threads on the body portion 12 to a sufficient extent that the stem member 32 and cutter 36 may be rotated and axially advanced within the drive socket 14 without exerting too great an effort on the turning tool (not shown).

In the use of the tapping tee 10 of the present invention, it is first mounted on the exterior portion of a main pipeline M that is to be tapped by securing its saddle portion 22 to the pipeline in any suitable or conventional manner, such as those hereinbefore described. After the tee 10 is securely mounted on the pipeline M, the service line or lines (not shown) that are to be connected to the main pipeline M are secured to the end or ends of the body portion 12 defining the outlet socket or sockets 16.

Thereafter, the cap member 28 is removed from the body portion 12 defining the drive socket 14, and a turning tool (not shown) is inserted into the complementary socket 34 within the outer end of the stem member 32 disposed within the drive socket. The turning tool is then rotated to advance the stem member 32 and cutter 36 axially inwardly within the drive socket 14. The cutter 36 is thus advanced into engagement with the pipeline M and cuts completely therethrough to remove a circular coupon 50 therefrom, as shown in FIG. 3. The cutter 36 is advanced into the pipeline M until the stop ring 42 mounted on the stem member 32 engages the outer surface of the pipeline to prevent further inward movement of the cutter 36 and the stem member 32.

Owing to the downwardly and inwardly tapered outer surface 40 of the cutter member 36, a complementary taper is formed on a cut surface 52 of the pipeline M defining the opening therein. The tapered outer surface of the cutter 36 causes the lower portion of the cutter to be deformed inwardly to a slight extent as it is cutting through the pipeline and to acquire a permanent inward set which serves to retain the cut coupon 50 positively within the cutter, thereby preventing the coupon 50 from falling into the pipeline. The tapered cut surface on the pipeline M serves as a valve seat with which the outer wall of the cutter 36 is adapted to sealingly mate for the purpose of closing the cut opening within the pipeline. It will be readily seen, therefore, that the cutter 36 is adapted to serve as a valve to selectively open and close the cut opening in the pipeline M after the coupon 50 has been cut therefrom. This is accomplished because of the tapered outer surface 40 of the cutter which forms the complementary tapered cut surfaces 52 on the pipeline.

After the coupon 50 is cut from the pipeline M, communication may be established between the pipeline and one or more service lines connected to the body portion 12 of the tee 10, by merely rotating the stem portion 32 to advance it and the cutter axially outwardly in the drive socket 14 to the position shown in FIG. 4 wherein fluid may flow through the cut opening in the pipeline, through the channel 18, into the outlet socket 16 and thereafter through the service line (not shown). When it is desired to cut off communication between the pipeline and a service line, the stem member 32 is rotated by the turning tool to axially advance the stem member and cutter 36 inwardly until the outer tapered surface 40 of the cutter tightly engages the complementary tapered cut surface 52 on the pipeline to close the cut opening therein. Owing to the long uniform taper of the outer surface of the cutter 36, each time it is reseated on a cut tapered surface 52 of the pipeline M, it serves to reform this cut surface to insure that it conforms with the tapered configuration and diameter of the cutter, thereby producing an extended life valve seat which will sealingly engage the cutter.

It will be seen that, because of the unitary molded construction of the tapping tee 10 of the present invention, and a simple construction of the stem member 32 and cutter 36, with the cutter 36 serving both as a cutting member and as a valve, the tapping tee 10 is capable of being easily and cheaply manufactured with a minimum of component parts, is substantially maintenance free in operation, and is easy to use.

I claim:

1. A tapping tee adapted to be mounted on a main pipeline to connect a service line thereto, said tapping tee comprising:
a body portion defining a threaded drive socket and an outlet socket in communication with said drive socket, said outlet socket being adapted to be connected to the service line,
a stem member mounted in said drive socket for rotary and axial movement therein, said stem member having exterior threads in engagement with the drive socket threads, and
an annular cutter connected to the inner end of said stem member and adapted to cut through the pipeline and retain therein a substantially circular coupon from the pipeline when said stem member is rotated and advanced inwardly in said drive socket, the outer annular surface of said cutter being tapered downwardly and inwardly in a uniform manner throughout substantially the entire length thereof so as to form a complementary tapered annular cut surface on the pipeline when the coupon is removed therefrom,
whereby said tapered cut pipeline surface serves as a seat adapted to sealingly engage said outer annular cutter surface when the cutter is moved inwardly into engagement therewith to close the opening cut in the pipeline.

2. The tapping tee of claim 1 wherein said cutter comprises a thin, flexible deformable annular wall which is adapted to be deformed inwardly to a sufficient extent as it cuts through the pipeline to retain the cut coupon therein and to prevent it from falling into the pipeline.

3. The tapping tee of claim 1 wherein stop means is provided on said stem member and is adapted to engage the outer surface of the pipeline to limit the extent of movement of said cutter into the pipeline.

4. The tapping tee of claim 3 wherein said stop means is positioned to engage said body portion when said stem member is moved outwardly within said drive socket to limit the outward movement of said stem member.

5. The tapping tee of claim 4 wherein said stop means comprises an annular stop ring mounted on said stem member adjacent the outer end of said cutter.

6. The tapping tee of claim 1, further comprising a saddle portion integrally formed with said body portion and adapted to mate with the adjacent outer surface of the pipeline.

7. The tapping tee of claim 1 wherein said stem member threads are of a slightly different pitch than that of said drive socket threads to effect an interference fit therewith and to prevent the passage of fluid therebetween.

8. The tapping tee of claim 1 wherein said body portion is molded of a plastic material, and said stem member and cutter are formed of metal.

9. The tapping tee of claim 1 wherein a cap member is removably receivable on the outer end of said body portion defining said drive socket for the purpose of closing said drive socket.

10. A tapping tee adapted to be mounted on a main pipeline to connect a service line thereto, said tapping tee comprising:
a body portion defining a drive socket and an outlet socket in communication with said drive socket, said outlet socket being adapted to be connected to the service line,
a stem member mounted in said drive socket for axial movement therein,
an annular cutter connected to the inner end of said stem member and adapted to cut through the pipeline and retain therein a substantially circular coupon cut from the pipeline when said stem member is moved axially inwardly in said drive socket, the outer annular surface of said cutter being tapered downwardly and inwardly throughout substantially the entire length thereof so as to form a complementary tapered annular cut surface on the pipeline when the coupon is removed therefrom, whereby said tapered cut pipeline surface serves as a seat adapted to sealingly engage said outer annular cutter surface when the cutter is moved inwardly into engagement therewith to close the opening cut in the pipeline.

* * * * *